W. H. TAMBLING.
Churn.

No. 20,740.

Patented June 29, 1858.

UNITED STATES PATENT OFFICE.

W. H. TAMBLING, OF BERLIN, WISCONSIN, ASSIGNOR TO AARON HILTON.

CHURN.

Specification of Letters Patent No. 20,740, dated June 29, 1858.

*To all whom it may concern:*

Be it known that I, WM. H. TAMBLING, of Berlin, in the county of Marquette and State of Wisconsin, have invented a new and useful Improvement in Churns; and I do hereby declare that the following is a full, clear, and exact description of the same, reference being had to the accompanying drawings, forming a part of this specification, in which—

Figure 2:
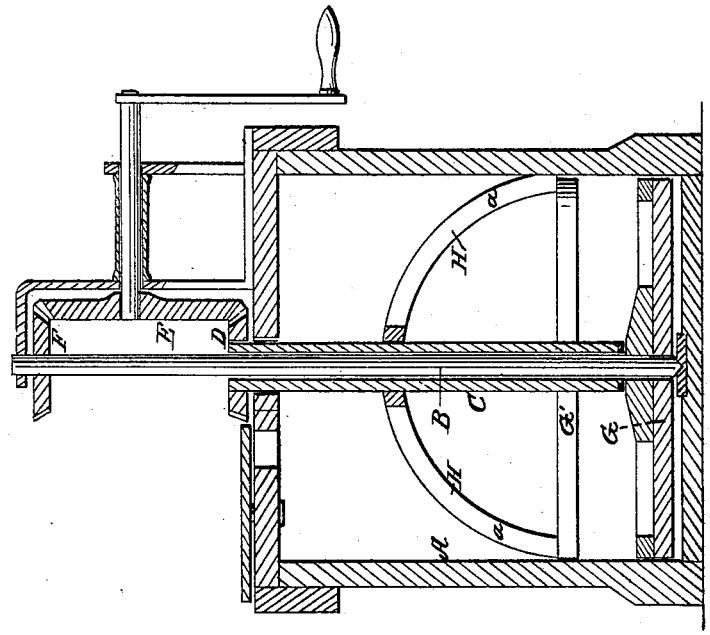
Figure 1:
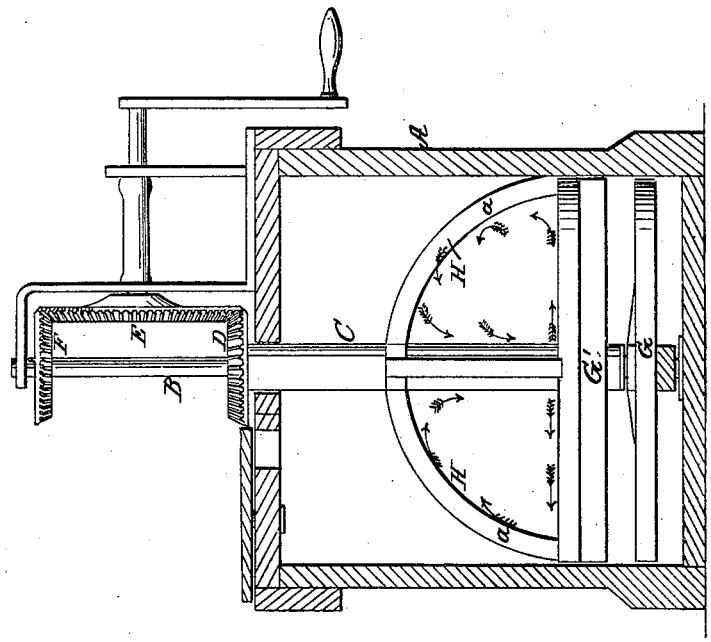

Figure 1, is a vertical section of a churn, the line of section being taken at one side of the dasher. Fig. 2, is a vertical central section of the same.

Similar letters of reference in each of the several figures indicate corresponding parts.

The nature of my invention consists in arranging a skeleton semisphere on the upper side of the upper dasher of reverse acting or forward and back acting churns, so that the tendency of the cream or milk to fly out centrifugally will be counteracted and its direction reversed and it rolled over and compelled to move centripetally or toward the center. By this arrangement no portion of the cream will be left undisturbed, but the whole mass will be perfectly agitated, as the two horizontal disk dashers will keep it in motion about the bottom of the churn, while the ribs of the skeleton semisphere will cut up the cream above the dashers in the revolution of the semisphere, and by their quadrant, concave or arched form they will continuously reverse the course of the cream and invert the same and thus keep it in a position and condition for being effectually operated upon.

To enable others, skilled in the art, to make and use my invention, I will proceed to describe its construction and operation.

A, represents the churn tub of ordinary construction.

B, C, are two dasher shafts, one solid and the other tubular, the tubular shaft surrounding the solid one as usual and revolving in an opposite direction to the same.

D, E, F, are bevel wheels for revolving these shafts in opposite directions.

G, G', are two horizontally arranged flat dashers. G, is placed on the solid shaft and G', on the tubular shaft. The dasher G, is arranged a short distance below G', but in the same vertical line as shown. The churn thus far described is similar to churns of this character now in use.

H, is the skeleton semisphere arranged around the tubular shaft and connected by its ribs a, a, a, a, to the outer edge of the upper dasher as shown so as to revolve with said shaft and dasher. In the drawing, four ribs a, are shown as constituting the semi-sphere, but in practice I may use six, eight, or more as necessity may demand. The action of the semi-sphere upon the cream will be evident from the drawing, the arrows illustrating the course of the cream as it is moved around in the path of a horizontal circle, it rising out of said path by reason of its tendency to move off centrifugally, and moving along the under concave surface of the semi-sphere and falling down at the center of the churn ready to be forced out centrifugally and to again be returned to the center. The office of the circular disk form dashers is to agitate the cream near the bottom of the churn, while that of the skeleton semisphere is to agitate it near the center of the height of the churn.

To render the operation of the semi-sphere more perfect and effectual a series of fine wire ribs forming smaller semi-spheres may be placed intermediate between the shaft and the ribs a, a, a, a. It might also be well to form the semi-sphere entirely of wire and to construct it similar to a wire screen, the meshes however should be a considerable distance apart. It might likewise be advantageous to use a complete skeleton sphere, so that the cream or milk shall have a continuous rotary motion in the path of a vertical circle as well as a motion in the path of a horizontal circle, in this case the lower disk or dasher will be made of skeleton ribs and concave or semi-spherical so as to correspond with the semi-sphere H.

What I claim as my invention and desire to secure by Letters Patent is—

Arranging a skeleton semi-sphere H, on the upper side of the upper dasher G' of reverse acting or forward and back acting churns—substantially as and for the purposes set forth.

The above specification of my improvement in churns signed by me this 8th day of June, 1858.

W. H. TAMBLING.

Witnesses:
G. N. SMITH,
THOS. E. BAKER.